(12) United States Patent
Sawamoto et al.

(10) Patent No.: US 7,974,778 B2
(45) Date of Patent: Jul. 5, 2011

(54) VEHICULAR CONTROL OBJECT DETERMINATION SYSTEM AND VEHICULAR TRAVEL LOCUS ESTIMATION SYSTEM

(75) Inventors: Kiichiro Sawamoto, Saitama (JP); Shigeru Inoue, Saitama (JP); Hiroshi Sato, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 632 days.

(21) Appl. No.: 11/229,364

(22) Filed: Sep. 16, 2005

(65) Prior Publication Data

US 2006/0149462 A1    Jul. 6, 2006

(30) Foreign Application Priority Data

Sep. 17, 2004  (JP) ................................. 2004-270894
Oct. 12, 2004  (JP) ................................. 2004-297151

(51) Int. Cl.
*G08G 9/02*    (2006.01)

(52) U.S. Cl. .............. 701/207; 701/36; 701/38; 701/45; 701/70; 701/72; 701/78; 701/82; 701/301; 701/302

(58) Field of Classification Search .................. 701/301, 701/302
See application file for complete search history.

(56) References Cited

U.S. PATENT DOCUMENTS

| | | | | |
|---|---|---|---|---|
| 5,307,419 A | * | 4/1994 | Tsujino et al. | 382/153 |
| 5,572,428 A | * | 11/1996 | Ishida et al. | 701/301 |
| 5,648,905 A | * | 7/1997 | Izumi et al. | 701/301 |
| 5,754,099 A | * | 5/1998 | Nishimura et al. | 340/435 |
| 5,790,403 A | * | 8/1998 | Nakayama | 701/28 |
| 5,815,825 A | * | 9/1998 | Tachibana et al. | 701/23 |
| 5,899,954 A | * | 5/1999 | Sato | 701/207 |
| 5,941,793 A | * | 8/1999 | Ito et al. | 477/120 |
| 5,955,967 A | * | 9/1999 | Yamada | 340/904 |
| 6,021,375 A | * | 2/2000 | Urai et al. | 701/301 |
| 6,061,627 A | * | 5/2000 | Sato | 701/207 |
| 6,138,062 A | * | 10/2000 | Usami | 701/23 |
| 6,141,617 A | * | 10/2000 | Matsuda et al. | 701/72 |
| 6,198,426 B1 | * | 3/2001 | Tamatsu et al. | 342/70 |
| 6,265,991 B1 | * | 7/2001 | Nishiwaki et al. | 340/903 |
| 6,311,119 B2 | * | 10/2001 | Sawamoto et al. | 701/96 |
| 6,498,969 B2 | * | 12/2002 | Alacoque et al. | 701/19 |
| 6,625,540 B2 | * | 9/2003 | Kageyama | 701/301 |
| 6,853,906 B1 | * | 2/2005 | Michi et al. | 701/207 |

(Continued)

FOREIGN PATENT DOCUMENTS

JP    07-006291    1/1995

(Continued)

*Primary Examiner* — Jack W Keith
*Assistant Examiner* — Jonathan M Dager
(74) *Attorney, Agent, or Firm* — O'Melveny & Myers LLP (57) ABSTRACT

In a vehicular control object determination system, locus correlation degree calculator calculates a degree of correlation between a future travel locus of a vehicle estimated by first travel locus estimator based on a vehicle speed and a yaw rate and a future travel locus of the vehicle estimated by second travel locus estimator based on a past travel locus of the vehicle calculated by travel locus calculator. When control object determiner determines a control object based on the travel locus estimated by the first travel locus estimator and predetermined control object determination conditions, the control object determination conditions are modified according to the degree of correlation, that is, the degree of reliability of the travel locus estimated by the first travel locus estimator, thereby achieving both accuracy with which the control object is determined and determination of the control object at a distance.

7 Claims, 9 Drawing Sheets

U.S. PATENT DOCUMENTS

| | | | |
|---|---|---|---|
| 6,873,899 B2 * | 3/2005 | Sawamoto | 701/96 |
| 6,961,661 B2 * | 11/2005 | Sekiguchi | 701/301 |
| 7,046,822 B1 * | 5/2006 | Knoeppel et al. | 382/103 |
| 7,243,026 B2 * | 7/2007 | Kudo | 701/301 |
| 7,272,482 B2 * | 9/2007 | Kubota | 701/96 |
| 2001/0014846 A1 * | 8/2001 | Sawamoto et al. | 701/96 |
| 2001/0018641 A1 * | 8/2001 | Kodaka et al. | 701/301 |
| 2002/0133285 A1 * | 9/2002 | Hirasago | 701/96 |
| 2002/0177953 A1 * | 11/2002 | Okamura et al. | 701/301 |
| 2003/0158666 A1 * | 8/2003 | Koike et al. | 701/301 |
| 2003/0204298 A1 * | 10/2003 | Ahmed-Zaid et al. | 701/96 |
| 2003/0210807 A1 * | 11/2003 | Sato et al. | 382/104 |
| 2004/0128066 A1 * | 7/2004 | Kudo et al. | 701/204 |
| 2004/0143381 A1 * | 7/2004 | Regensburger et al. | 701/36 |
| 2004/0158377 A1 * | 8/2004 | Matsumoto et al. | 701/48 |
| 2004/0193347 A1 * | 9/2004 | Harumoto et al. | 701/45 |
| 2004/0204807 A1 * | 10/2004 | Kimura et al. | 701/36 |
| 2004/0254729 A1 * | 12/2004 | Browne et al. | 701/301 |
| 2004/0257244 A1 * | 12/2004 | Kubota et al. | 340/932.2 |
| 2005/0004762 A1 * | 1/2005 | Takahama et al. | 701/301 |
| 2005/0080565 A1 * | 4/2005 | Olney et al. | 701/301 |
| 2006/0267748 A1 * | 11/2006 | Knoop et al. | 340/435 |
| 2007/0038372 A1 * | 2/2007 | Kudo et al. | 701/211 |

FOREIGN PATENT DOCUMENTS

| | | |
|---|---|---|
| JP | 07-085257 | 3/1995 |
| JP | 07-319541 | 12/1995 |
| JP | 08-221699 | 8/1996 |
| JP | 09-033651 | 2/1997 |
| JP | 11-224398 | 8/1999 |
| JP | 2000-065924 | 3/2000 |
| JP | 2001-230835 | 8/2001 |
| JP | 2001-291197 | 10/2001 |
| JP | 2001-357497 | 12/2001 |
| JP | 2002-099904 | 4/2002 |
| JP | 2002319100 | 10/2002 |
| JP | 2003-002141 | 1/2003 |
| JP | 2003-200754 | 7/2003 |
| JP | 2003-240568 | 8/2003 |
| JP | 2003-296899 | 10/2003 |
| JP | 2004110390 | 4/2004 |

* cited by examiner

VEHICULAR CONTROL OBJECT DETERMINATION SYSTEM AND VEHICULAR TRAVEL LOCUS ESTIMATION SYSTEM

RELATED APPLICATION DATA

The present application claims priority to Japanese priority application Nos. 2004-270894 and 2004-297151, filed Sep. 17, and Oct. 12, 2004, respectively, which are hereby incorporated in their entirety herein by reference.

BACKGROUND OF THE INVENTION

1. Field of the Invention

The present invention relates to a vehicular control object determination system that includes an object detector for detecting an object that is present in the direction of travel of a vehicle, a vehicle speed sensor for detecting a vehicle speed, a yaw rate sensor for detecting a yaw rate, a first travel locus estimator for estimating a future travel locus of the vehicle based on the vehicle speed detected by the vehicle speed sensor and the yaw rate detected by the yaw rate sensor, and a control object determiner for determining a control object based on a detection result obtained by the object detector, the travel locus estimated by the first travel locus estimator, and predetermined control object determination conditions.

The present invention also relates to a vehicular travel locus estimation system that includes a vehicle speed sensor for detecting a vehicle speed, a yaw rate sensor for detecting a yaw rate, a first travel locus estimator for estimating a future travel locus of the vehicle based on the vehicle speed detected by the vehicle speed sensor and the yaw rate detected by the yaw rate sensor, and an estimated travel locus output providing an estimated travel locus.

2. Description of the Related Art

Japanese Patent Application Laid-open No. 2004-110390 discloses a system in which, in order to estimate a future travel path of a subject vehicle, a first subject vehicle travel path is estimated based on road information, a second subject vehicle travel path is estimated based on three-dimensional object information, a third subject vehicle travel path is estimated based on running conditions of the subject vehicle, a new subject vehicle travel path is calculated from these first to third subject vehicle travel paths, and a final subject vehicle travel path is calculated from a previously calculated subject vehicle travel path and a currently calculated subject vehicle travel path.

However, in this conventional arrangement, it is necessary to add new detection means such as a camera in order to estimate the subject vehicle travel path based on road information and three-dimensional object information, and further there is a case where a lane, which is primary road information, cannot be detected with good accuracy at night or when it is raining, snowing, etc., leading to a possibility that it becomes impossible to secure the accuracy with which the subject vehicle travel path is calculated. Furthermore, since the final subject vehicle travel path is calculated from the previously calculated subject vehicle travel path and the currently calculated subject vehicle travel path, there is a possibility that a time delay might occur in obtaining the final subject vehicle travel path by calculation, and the timing of identification of an object such as a preceding vehicle might be delayed.

Japanese Patent Application Laid-open No. 2002-319100 discloses a system in which a vehicle travel locus is estimated based on a yaw rate and a vehicle speed; when it is determined that the vehicle has shifted from a traveling state to a stationary state, an estimated travel locus prior to becoming stationary is kept, thereby estimating a travel locus when a vehicle that has stopped partway through a corner starts traveling.

However, when the vehicle speed is low, the output of the yaw rate sensor is unstable, and the accuracy with which the yaw rate is detected is degraded. Therefore, the reliability of the yaw rate detected immediately before the vehicle stops is low, and thus the reliability of the travel locus immediately before the vehicle stops, which is estimated based on the yaw rate, is also low. Consequently, even if an attempt is made to estimate the travel locus after the vehicle starts using this low reliability travel locus, there is a limit to the accuracy of the estimated travel locus.

SUMMARY OF THE INVENTION

The present invention has been accomplished under the above-mentioned circumstances, and it is a first object thereof to appropriately determine a control object, such as a preceding vehicle, for controlling the travel of a subject vehicle.

Furthermore, it is a second object of the present invention to estimate a travel locus with good accuracy when a vehicle that has stopped starts traveling.

In order to achieve the first object, according to a first feature of the present invention, there is provided a vehicular control object determination system comprising: an object detector for detecting an object that is present in the direction of travel of a vehicle; a vehicle speed sensor for detecting a vehicle speed; a yaw rate sensor for detecting a yaw rate; a first travel locus estimator for estimating a future travel locus of the vehicle based on the vehicle speed detected by the vehicle speed sensor and the yaw rate detected by the yaw rate sensor, a control object determiner for determining a control object based on a detection result obtained by the object detector, a travel locus estimated by the first travel locus estimator, and predetermined control object determination conditions; a travel locus calculator for calculating a past travel locus of the vehicle; a second travel locus estimator for estimating a future travel locus of the vehicle based on the calculated past travel locus; and a locus correlation degree calculator for determining a degree of correlation between the travel locus estimated by the first travel locus estimator and the travel locus estimated by the second travel locus estimator; the control object determiner modifying the control object determination conditions based on an output of the locus correlation degree calculator.

With this arrangement, the locus correlation degree calculator calculates the degree of correlation between the future travel locus of the vehicle estimated by the first travel locus estimator based on the vehicle speed and the yaw rate, and the future travel locus of the vehicle estimated by the second travel locus estimator based on the past travel locus of the vehicle calculated by the travel locus calculator, and when determining a control object based on the travel locus estimated by the first travel locus estimator and the predetermined control object determination conditions, the control object determiner modifies the control object determination conditions according to the degree of correlation, that is, according to the degree of reliability of the travel locus estimated by the first travel locus estimator. Therefore, it is possible to achieve both accuracy with which the control object is determined and determination of the control object at a distance.

According to a second feature of the present invention, in addition to the first feature, the control object determiner determines as a control object an object detected by the object detector if the relative distance between the position of the object and the travel locus estimated by the first travel locus estimator is equal to or less than a predetermined value, and modifies, based on the degree of correlation calculated by the locus correlation degree calculator, the effective length of the travel locus estimated by the first travel locus estimator.

With this arrangement, when determining an object detected by the object detector as the control object if the relative distance between the position of the object and the travel locus estimated by the first travel locus estimator is equal to or less than the effective detection distance, the effective length of the estimated travel locus is modified according to the degree of reliability of the travel locus estimated by the first travel locus estimator. Therefore, it is possible to determine a control object up to the maximum distance while securing the accuracy with which the control object is determined.

According to a third feature of the present invention, in addition to the second feature, the control object determiner increases the effective length of the estimated travel locus when the degree of correlation calculated by the locus correlation degree calculator is equal to or greater than a predetermined value.

With this arrangement, the effective length of the estimated travel locus is increased when the degree of correlation is equal to or greater than the predetermined value. Therefore, it is possible to determine a control object up to the maximum distance when the degree of reliability of the travel locus estimated by the first travel locus estimator is high.

According to a fourth feature of the present invention, in addition to the second or third feature, the control object determiner reduces the effective length of the estimated travel locus when the degree of correlation calculated by the locus correlation degree calculator is less than a predetermined value.

With this arrangement, the effective length of the estimated travel locus is reduced when the degree of correlation is less than the predetermined value. Therefore, it is possible to prevent erroneous determination of a control object when the degree of reliability of the travel locus estimated by the first travel locus estimator is low.

According to a fifth feature of the present invention, in addition to the first feature, the control object determiner determines as a control object an object detected by the object detector if the distance between the subject vehicle and the position of the object is equal to or less than an effective detection distance, and modifies the effective detection distance based on the degree of correlation calculated by the locus correlation degree calculator.

With this arrangement, when determining an object detected by the object detector as the control object if the distance between the position of the object and the subject vehicle is equal to or less than the effective detection distance, the effective detection distance is modified according to the degree of reliability of the travel locus estimated by the first travel locus estimator. Therefore, it is possible to determine a control object up to the maximum distance while securing the accuracy with which the control object is determined.

According to a sixth feature of the present invention, in addition to the fifth feature, wherein the control object determiner increases the effective detection distance when the degree of correlation calculated by the locus correlation degree calculator is equal to or greater than a predetermined value.

With this arrangement, the effective detection distance is increased when the degree of correlation is equal to or greater than the predetermined value. Therefore, it is possible to determine a control object up to the maximum distance when the degree of reliability of the travel locus estimated by the first travel locus estimator is high.

According to a seventh feature of the present invention, in addition to the fifth or sixth feature, the control object determiner reduces the effective detection distance when the degree of correlation calculated by the locus correlation degree calculator is less than a predetermined value.

With this arrangement, the effective detection distance is reduced when the degree of correlation is less than the predetermined value. Therefore, it is possible to prevent erroneous determination of a control object when the degree of reliability of the travel locus estimated by the first travel locus estimator is low.

According to an eighth feature of the present invention, in addition to the first feature, the locus correlation degree calculator calculates a degree of correlation based on a difference between the travel locus estimated by the first travel locus estimator and the travel locus estimated by the second travel locus estimator.

With this arrangement, the degree of correlation is calculated based on the difference between the travel locus estimated by the first travel locus estimator and the travel locus estimated by the second travel locus estimator. Therefore, it is possible to calculate the degree of correlation with good accuracy.

According to a ninth feature of the present invention, in addition to the first feature, the locus correlation degree calculator calculates the degree of correlation based on a degree of similarity in two-dimensional shape between the travel locus estimated by the first travel locus estimator and the travel locus estimated by the second travel locus estimator.

With this arrangement, the degree of correlation is calculated based on the degree of similarity in two-dimensional shape between the travel locus estimated by the first travel locus estimator and the travel locus estimated by the second travel locus estimator. Therefore, it is possible to calculate the degree of correlation with good accuracy.

According to a tenth feature of the present invention, in addition to the first feature, the locus correlation degree calculator calculates the degree of correlation based on a difference between a turning radius of the travel locus estimated by the first travel locus estimator and a turning radius of the travel locus estimated by the second travel locus estimator.

With this arrangement, the degree of correlation is calculated based on the difference between the turning radius of the travel locus estimated by the first travel locus estimator and the turning radius of the travel locus estimated by the second travel locus estimator. Therefore, it is possible to calculate the degree of correlation with good accuracy.

In order to achieve the second object, according to an eleventh feature of the present invention, there is provided a vehicular travel locus estimation system comprising: a vehicle speed sensor for detecting a vehicle speed; a yaw rate sensor for detecting a yaw rate; first travel locus estimator for estimating a future travel locus of the vehicle based on the vehicle speed detected by the vehicle speed sensor and the yaw rate detected by the yaw rate sensor; estimated travel locus output providing an estimated travel locus; travel locus calculator for calculating a past travel locus of the vehicle; and second travel locus estimator for estimating a future travel locus of the vehicle based on the calculated past travel locus; the estimated travel locus output providing the travel locus estimated by the second travel locus estimator when the vehicle speed detected by the vehicle speed sensor is equal to or less than a predetermined value and a change per unit time in the yaw rate detected by the yaw rate sensor is equal to or greater than a predetermined value.

With this arrangement, when the vehicle speed detected by the vehicle speed sensor is equal to or less than the predetermined value, and the change per unit time in yaw rate detected by the yaw rate sensor is equal to or greater than the predetermined value, that is, when the reliability of the yaw rate outputted by the yaw rate sensor is low, the estimated travel locus output does not provide a future travel locus of the vehicle estimated by the first travel locus estimator using the yaw rate, but instead provides a future travel locus of the vehicle estimated by the second travel locus estimator based on the past travel locus of the vehicle calculated by the travel locus calculator. Therefore, it is possible to enhance the accuracy of the future travel locus outputted even when the vehicle that has stopped starts traveling.

In order to achieve the second object, according to a twelfth feature of the present invention, there is provided a vehicular travel locus estimator comprising: a vehicle speed sensor for detecting a vehicle speed; a yaw rate sensor for detecting a yaw rate; first travel locus estimator for estimating a future travel locus of the vehicle based on the vehicle speed detected by the vehicle speed sensor and the yaw rate detected by the yaw rate sensor; estimated travel locus output providing the estimated travel locus; travel locus calculator for calculating a past travel locus of the vehicle; second travel locus estimator for estimating a future travel locus of the vehicle based on the calculated past travel locus; and stationary state determiner for determining that the vehicle is in a substantially stationary state; the estimated travel locus output providing the travel locus estimated by the second travel locus estimator when the stationary state determiner determines that the vehicle is in a substantially stationary state.

With this arrangement, when the stationary state determiner determines that the vehicle is in a substantially stationary state, that is, the reliability of the yaw rate outputted by the yaw rate sensor is low, the estimated travel locus output does not provide a future travel locus of the vehicle estimated by the first travel locus estimator using the yaw rate, but instead provides a future travel locus of the vehicle estimated by the second travel locus estimator based on the past travel locus of the vehicle calculated by the travel locus calculator. Therefore, it is possible to enhance the accuracy of the future travel locus even when the vehicle that has stopped starts traveling.

According to a thirteenth feature of the present invention, in addition to the eleventh or twelfth feature, the travel locus calculator has an absolute coordinate system that enables a subject vehicle position and a subject vehicle direction to be recorded with a given point as a reference, calculates a subject vehicle direction in the absolute coordinate system based on the yaw rate detected by the yaw rate sensor, calculates a plurality of subject vehicle positions based on the calculated subject vehicle direction and the vehicle speed detected by the vehicle speed sensor, and calculates the past travel locus of the vehicle from the plurality of calculated subject vehicle positions in the absolute coordinate system.

With this arrangement, the travel locus calculator calculates the subject vehicle direction in the absolute coordinate system based on the yaw rate detected by the yaw rate sensor, calculates the plurality of subject vehicle positions in the absolute coordinate system based on the subject vehicle direction and the vehicle speed detected by the vehicle speed sensor, and calculates the past travel locus of the vehicle from the plurality of subject vehicle positions. Therefore, it is possible to calculate the past travel locus of the vehicle by employing the yaw rate sensor and the vehicle speed sensor which are also used when the first travel locus estimator estimates the future travel locus of the vehicle.

According to a fourteenth feature of the present invention, in addition to the eleventh or twelfth feature, the system further comprises a steering angle sensor for detecting a steering angle of the vehicle; and the travel locus calculator has an absolute coordinate system that enables a subject vehicle position and a subject vehicle direction to be recorded with a given point as a reference, calculates a subject vehicle direction in the absolute coordinate system based on the steering angle detected by the steering angle sensor, calculates a plurality of subject vehicle positions based on the calculated subject vehicle direction and the vehicle speed detected by the vehicle speed sensor, and calculates the past travel locus of the vehicle from the plurality of calculated subject vehicle positions in the absolute coordinate system.

With this arrangement, the travel locus calculator calculates the subject vehicle direction in the absolute coordinate system based on the steering angle detected by the steering angle sensor, calculates the plurality of subject vehicle positions in the absolute coordinate system based on the subject vehicle direction and the vehicle speed detected by the vehicle speed sensor, and calculates the past travel locus of the vehicle from the plurality of subject vehicle positions. Therefore, it is possible to calculate the past travel locus of the vehicle by employing the steering angle sensor which is generally provided in a vehicle.

According to a fifteenth feature of the present invention, in addition to the eleventh or twelfth feature, the system further comprises subject vehicle position detector for detecting a subject vehicle position in an absolute coordinate system based on a signal from outside the vehicle, and subject vehicle position memory for storing the detected subject vehicle position; and the travel locus calculator calculates the past travel locus of the vehicle from a plurality of subject vehicle positions stored by the subject vehicle position memory.

With this arrangement, the subject vehicle position memory stores the subject vehicle position detected in the absolute coordinate system by the subject vehicle position detector based on the signal from outside the vehicle, and the travel locus calculator calculates the past travel locus of the vehicle from the plurality of stored subject vehicle positions. Therefore, it is possible to easily calculate the past travel locus of the vehicle by utilizing the output from the subject vehicle position detector.

According to a sixteenth feature of the present invention, in addition to the thirteenth feature, the travel locus calculator calculates the past travel locus of the vehicle by subjecting the plurality of subject vehicle positions in the absolute coordinate system to a least-squares procedure.

With this arrangement, the travel locus calculator calculates the past travel locus of the vehicle by subjecting the plurality of subject vehicle positions in the absolute coordinate system to a least-squares procedure. Therefore, it is possible to calculate the past travel locus of the vehicle with good accuracy even if there are variations, due to errors, in the arrangement of the plurality of subject vehicle positions.

According to a seventeenth feature of the present invention, in addition to the fourteenth feature, the travel locus calculator calculates the past travel locus of the vehicle by subjecting the plurality of subject vehicle positions in the absolute coordinate system to a least-squares procedure.

With this arrangement, the travel locus calculator calculates the past travel locus of the vehicle by subjecting the plurality of subject vehicle positions in the absolute coordinate system to a least-squares procedure. Therefore, it is possible to calculate the past travel locus of the vehicle with good accuracy even if there are variations, due to errors, in the arrangement of the plurality of subject vehicle positions.

According to an eighteenth feature of the present invention, in addition to the fifteenth feature, the travel locus calculator calculates the past travel locus of the vehicle by subjecting the plurality of subject vehicle positions in the absolute coordinate system to a least-squares procedure.

With this arrangement, the travel locus calculator calculates the past travel locus of the vehicle by subjecting the plurality of subject vehicle positions in the absolute coordinate system to a least-squares procedure. Therefore, it is possible to calculate the past travel locus of the vehicle with good accuracy even if there are variations, due to errors, in the arrangement of the plurality of subject vehicle positions.

The above-mentioned object, other objects, characteristics, and advantages of the present invention will become apparent from an explanation of preferred embodiments that will be described in detail below by references to the attached drawings.

BRIEF DESCRIPTION OF THE DRAWINGS

FIG. 1 to FIG. 4 show a first embodiment of the present invention:

FIG. 5 and FIG. 6 show a second embodiment of the present invention:

FIG. 7 and FIG. 8 show a third embodiment of the present invention:

DETAILED DESCRIPTION OF THE PREFERRED EMBODIMENT

A first embodiment of the present invention will be described below by reference to FIG. 1 to FIG. 4.

Figure 1:
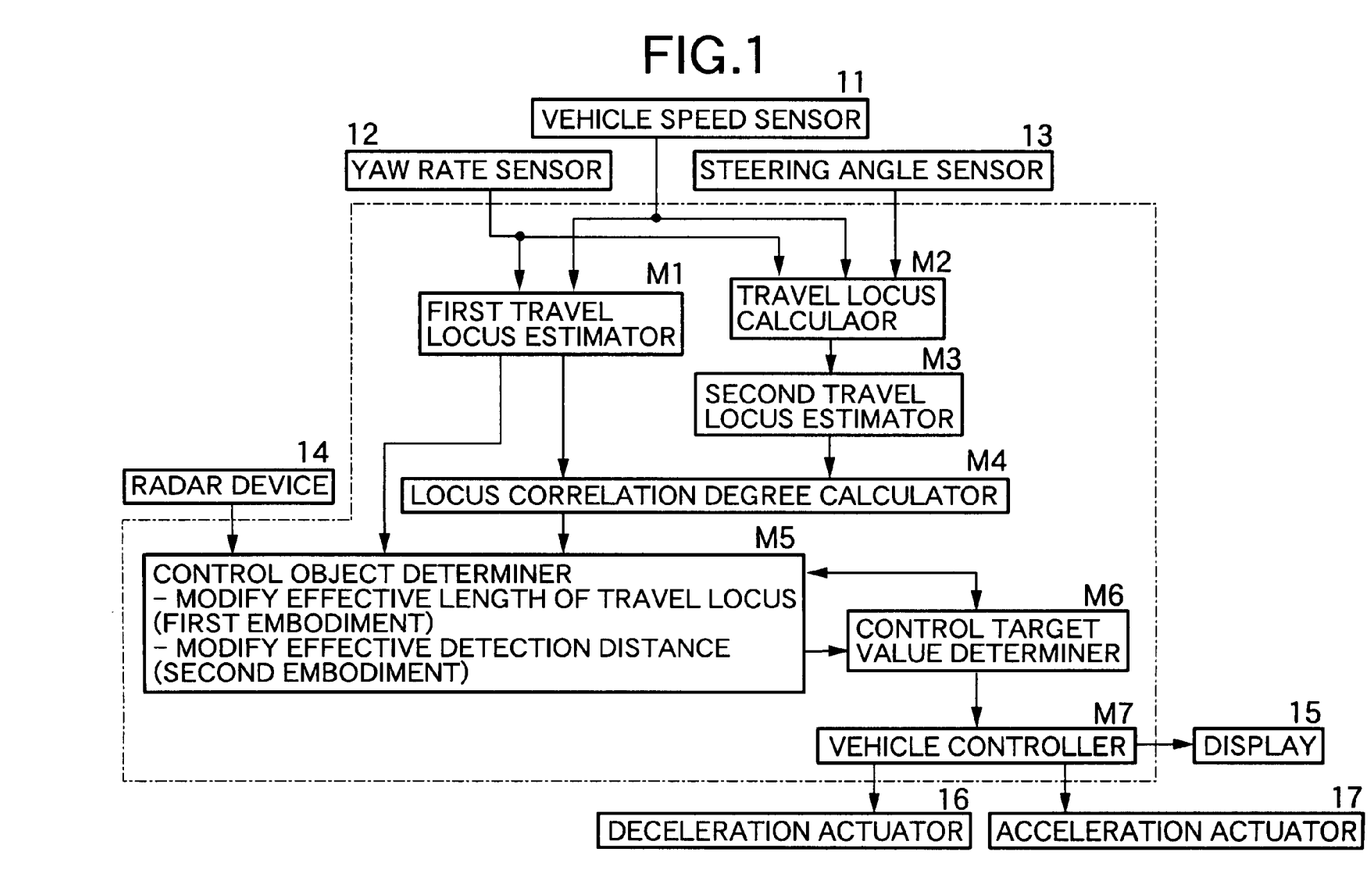
FIG. 1 is a block diagram of a control system for an ACC system.

FIG. 1 shows an ACC (Adaptive Cruise Control) system which maintains a preset inter-vehicle distance when there is a preceding vehicle, thus tracking the preceding vehicle, and maintains a preset vehicle speed when there is no preceding vehicle, thus keeping the speed constant. The ACC system includes: first travel locus estimator M1; travel locus calculator M2; second travel locus estimator M3; locus correlation degree calculator M4; control object determiner M5; control target value determiner M6; and vehicle controller M7.

Connected to the first travel locus estimator M1 are a vehicle speed sensor 11 and a yaw rate sensor 12. Connected to the travel locus calculator M2 are the vehicle speed sensor 11, the yaw rate sensor 12, and a steering angle sensor 13. Connected to the control object determiner M5 is a radar device 14. Connected to the vehicle controller M7 are a display 15, a deceleration actuator 16, and an acceleration actuator 17.

Figure 3:
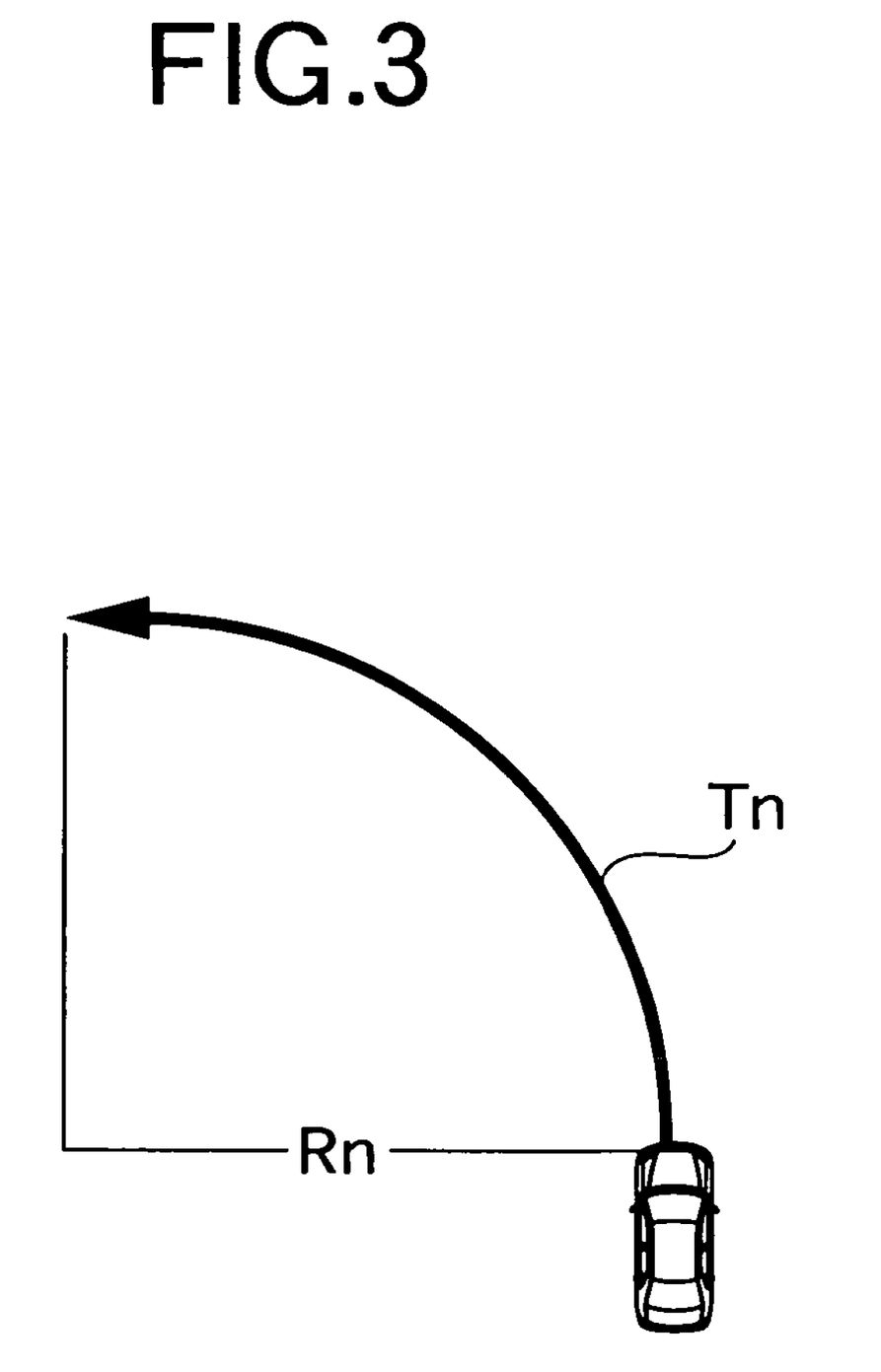
FIG. 3 is a diagram for explaining the operation of first travel locus estimator.

As shown in FIG. 3, the first travel locus estimator M1 estimates a future travel locus Tn of a subject vehicle based on a vehicle speed detected by the vehicle speed sensor 11 and a yaw rate detected by the yaw rate sensor 12. That is, since a turning radius Rn of the vehicle can be calculated from a present vehicle speed and yaw rate, the future travel locus Tn of the subject vehicle can be estimated by joining an arc having the turning radius Rn to a present direction of travel of the subject vehicle.

Figure 4:
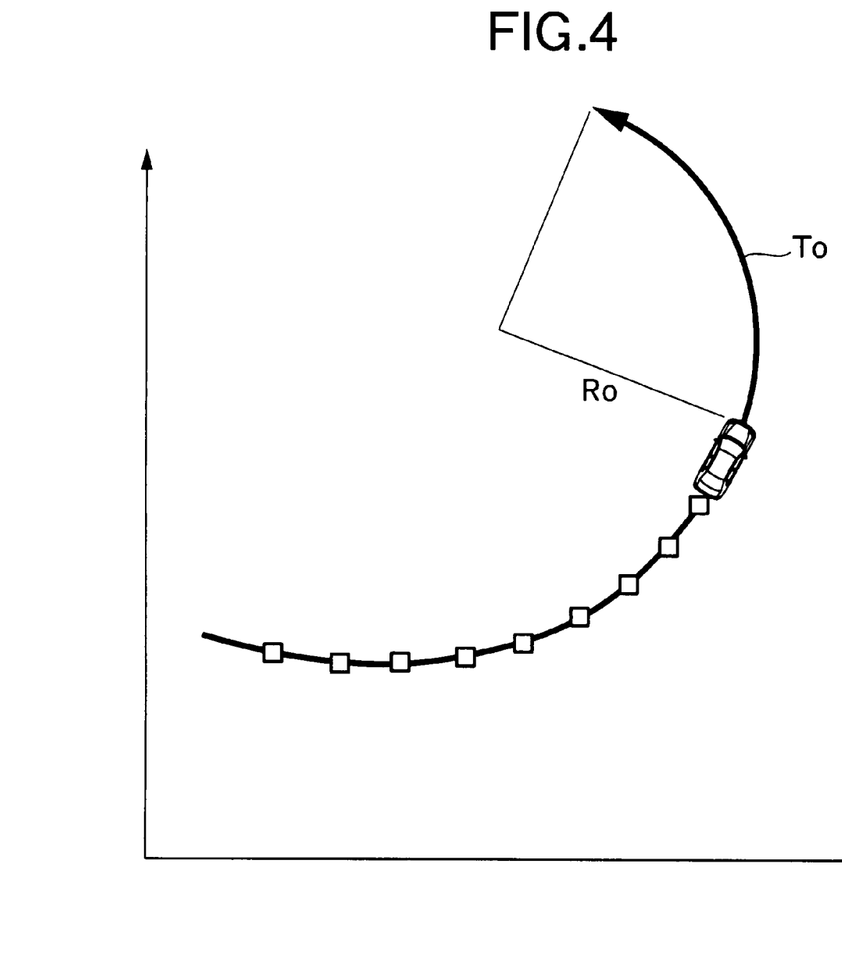
FIG. 4 is a diagram for explaining the operation of second travel locus estimator.

As shown in FIG. 4, the travel locus calculator M2 calculates an absolute direction of the subject vehicle in an absolute coordinate system from the integral of the yaw rate detected by the yaw rate sensor 12 or the cumulative steering angle detected by the steering angle sensor 13; and calculates at predetermined time intervals an absolute position of the subject vehicle in the absolute coordinate system from the absolute direction of the subject vehicle and the vehicle speed detected by the vehicle speed sensor 11. A past travel locus of the subject vehicle is obtained by calculation, that is, by subjecting absolute positions of the subject vehicle (positions shown by □ in FIG. 4) plotted in the absolute coordinate system at predetermined time intervals to a least-squares procedure. Here, carrying out the least-squares procedure enhances the accuracy with which the travel locus is calculated, even if an error is included in the plurality of subject vehicle positions plotted in the absolute coordinate system.

In this way, when the past travel locus of the subject vehicle is calculated from the yaw rate and the vehicle speed, the yaw rate sensor 12 and the vehicle speed sensor 11 for detecting the yaw rate and the vehicle speed in the first travel locus estimator M1 are used as they are, thereby preventing any increase in the number of sensors. Further, when the past travel locus of the subject vehicle is calculated from the steering angle, the steering angle sensor 13 which is generally provided in a vehicle is used as it is, thereby preventing any increase in the number of sensors.

The second travel locus estimator M3 estimates a future travel locus To of the subject vehicle by, for example, calculating a radius of curvature Ro at the terminal of the past travel locus of the subject vehicle (that is, the present subject vehicle position) and joining an arc having this radius of curvature Ro to the terminal of the past travel locus of the subject vehicle.

The locus correlation degree calculator M4 compares the future travel locus Tn of the subject vehicle estimated by the first travel locus estimator M1 with the future travel locus To of the subject vehicle estimated by the second travel locus estimator M3, and calculates a degree of correlation.

There are various modes for the degree of correlation; for example, a difference between the travel locus Tn estimated by the first travel locus estimator M1 and the travel locus To estimated by the second travel locus estimator M3 is calculated, and it can be determined that the smaller the difference the higher the degree of correlation. Alternatively, a degree of similarity in two-dimensional shape between the travel locus Tn estimated by the first travel locus estimator M1 and the travel locus Tn estimated by the second travel locus estimator M3 is calculated, and it can be determined that the higher the degree of similarity the higher the degree of correlation. Alternatively, a turning radius of the travel locus Tn estimated by the first travel locus estimator M1 and a turning radius of the travel locus To estimated by the second travel locus estimator M3 are calculated, and it can be determined that the smaller the difference therebetween the higher the degree of correlation.

The control object determiner M5 sets as a control object, among preceding vehicles detected by the radar device 14, a preceding vehicle that is on the travel locus Tn estimated by the first travel locus estimator M1. In this process, the control object determiner M5 modifies the effective length of the estimated travel locus Tn, that is, the distance up to the most distant preceding vehicle that is set as the control object. That is, when the degree of correlation calculated by the locus correlation degree calculator M4 is equal to or greater than a predetermined value, that is, when the travel locus Tn estimated by the first travel locus estimator M1 coincides well with the travel locus To estimated by the second travel locus estimator M3, the effective length of the estimated travel locus Tn is increased from a normal set value (e.g., 100 m) to an increased value (e.g., 120 m).

When the degree of correlation calculated by the locus correlation degree calculator M4 is less than a predetermined value, that is, when the travel locus Tn estimated by the first travel locus estimator M1 does not coincide well with the travel locus To estimated by the second travel locus estimator M3, the effective length of the estimated travel locus Tn is maintained at a normal set value (e.g., 100 m). In this case, the effective length of the travel locus Tn may be reduced from the normal set value (e.g., 100 m) to a reduced value (e.g., 80 m).

In this way, if a preceding vehicle detected by the radar device 14 is present within the effective length of the travel locus Tn set by the control object determiner M5, the preceding vehicle is determined as the control object.

The control target value determiner M6 determines a target vehicle speed, a target acceleration/deceleration, a target inter-vehicle distance, etc., which are parameters used for making the subject vehicle track the preceding vehicle that is the control object. The vehicle controller M7 operates the deceleration actuator 16 or the acceleration actuator 17 based on a control target value determined by the control target value determiner M6 so as to make a throttle valve open or close or operate a brake system, thus carrying out tracking control or constant speed travel control; and displays a present control state of the vehicle on the display 15 so as to inform a driver.

Figure 2:
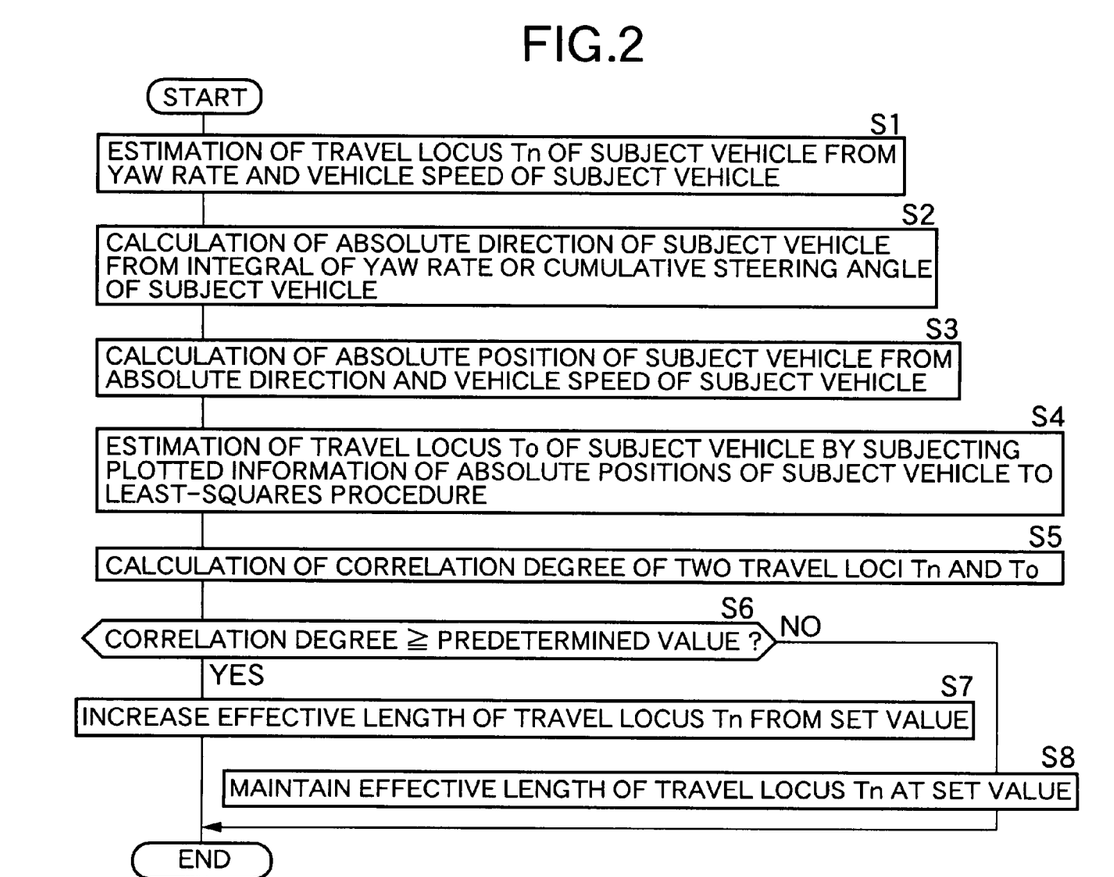
FIG. 2 is a flowchart for explaining the operation.

The above operation is now further described by reference to the flowchart of FIG. 2.

Firstly in step S1 the first travel locus estimator M1 estimates the future travel locus Tn of the subject vehicle based on the yaw rate and the vehicle speed. In the subsequent step S2 the travel locus calculator M2 calculates the absolute direction of the subject vehicle in the absolute coordinate system from the integral of the yaw rate or the cumulative steering angle. In step S3 the absolute position of the subject vehicle in the absolute coordinate system is calculated at predetermined time intervals from the absolute direction and the vehicle speed. Further, in step S4 the past travel locus of the subject vehicle is calculated by subjecting the coordinates of the plurality of absolute positions of the subject vehicle obtained at predetermined time intervals to the least-squares procedure, and the second travel locus estimator M3 estimates the future travel locus To of the subject vehicle from the past travel locus of the subject vehicle.

In the subsequent step S5 the travel locus Tn estimated by the first travel locus estimator M1 and the travel locus To estimated by the second travel locus estimator M3 are compared so as to calculate the degree of correlation between the two: if in step S6 the degree of correlation is equal to or greater than the predetermined value, then in step S7 the effective length of the estimated travel locus Tn is increased from the normal set value; and if in step S6 the degree of correlation is less than the predetermined value, then in step S8 the effective length of the estimated travel locus Tn is maintained at the normal set value.

A second embodiment of the present invention is now described by reference to FIG. 5 and FIG. 6.

Figure 6:
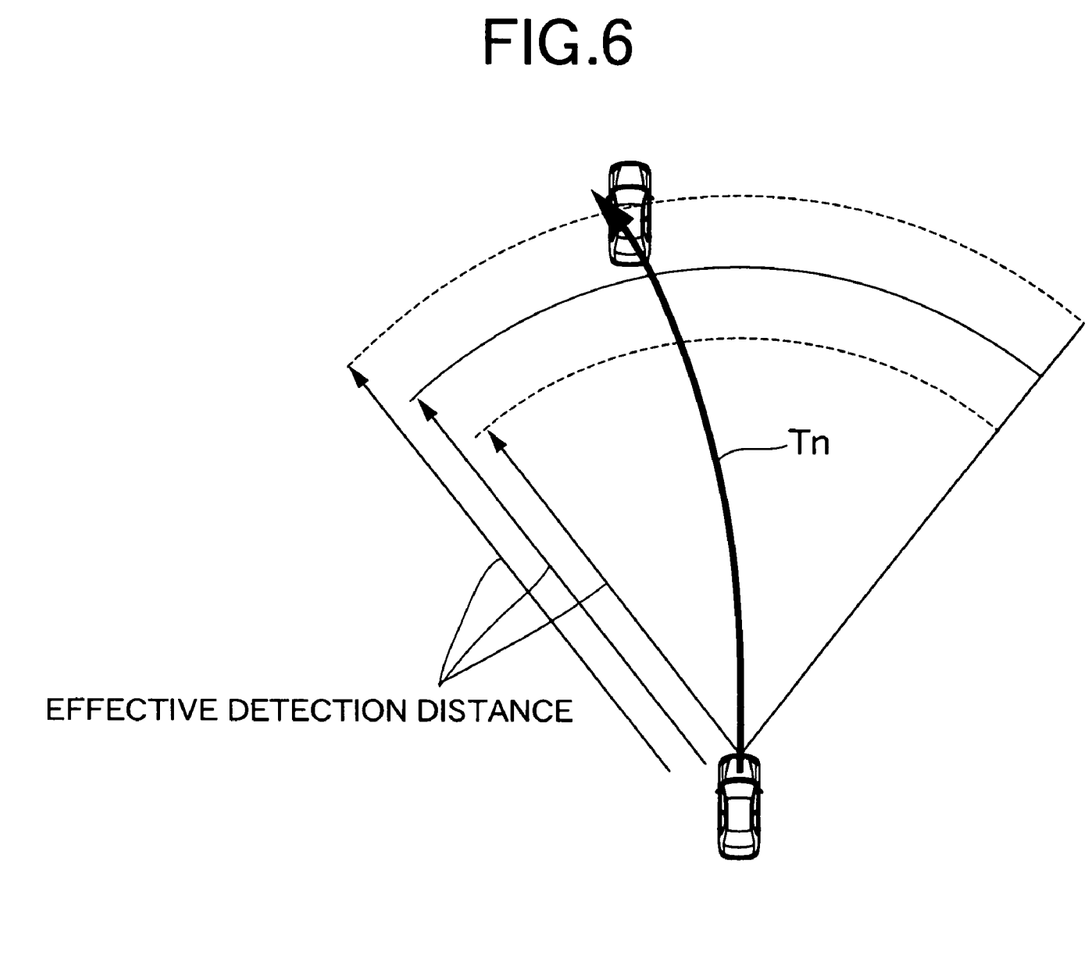
FIG. 6 is a diagram for explaining the operation of control object determiner.

In the first embodiment, the control object determiner M5 modifies, according to the degree of correlation calculated by the locus correlation degree calculator M4, the effective length of the travel locus in which the control object is determined, but as shown in FIG. 6 in the second embodiment the control object determiner M5 modifies, according to the degree of correlation calculated by the locus correlation degree calculator M4, the effective detection distance of the radar device 14 with which the control object is determined.

Figure 5:
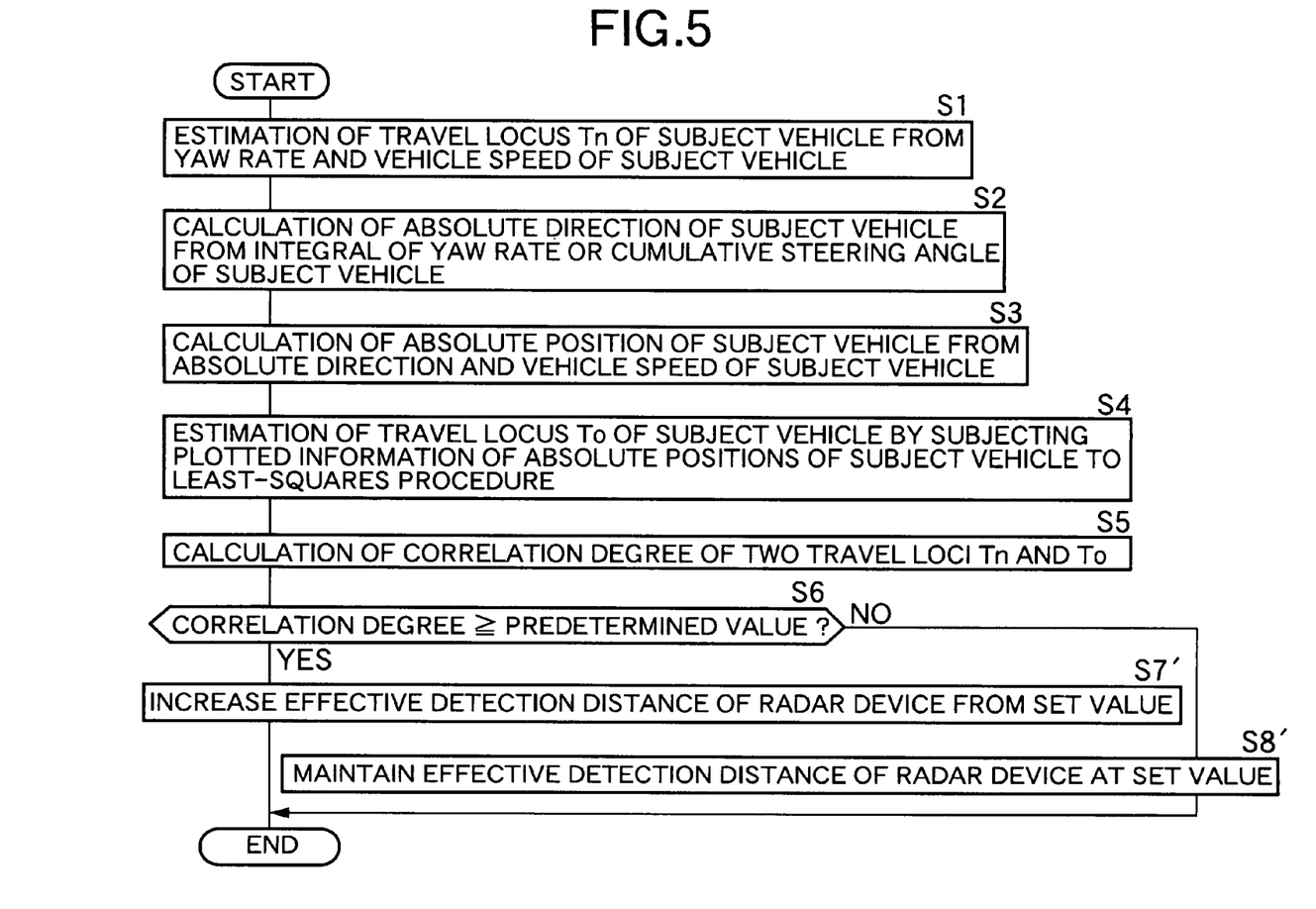
FIG. 5 is a flowchart corresponding to FIG. 2.

That is, when the degree of correlation calculated by the locus correlation degree calculator M4 is equal to or greater than a predetermined value, that is, when the travel locus Tn estimated by the first travel locus estimator M1 coincides well with the travel locus To estimated by the second travel locus estimator M3, the effective detection distance of the radar device 14 is increased from a normal set value (e.g., 100 m) to an increased value (e.g., 120 m) (see step S7' of FIG. 5).

Further, when the degree of correlation calculated by the locus correlation degree calculator M4 is less than the predetermined value, that is, the travel locus Tn estimated by the travel locus estimator M1 does not coincide well with the travel locus To estimated by the second travel locus estimator M3, the effective detection distance of the radar device 14 is maintained at the normal set value (e.g. 100 m) (see step S8' of FIG. 5). In this case, the effective detection distance of the radar device 14 may be reduced from the normal set value (e.g. 100 m) to a reduced value (e.g. 80 m).

As described above, the travel locus Tn estimated from the running conditions (vehicle speed and yaw rate) of the subject vehicle and the travel locus To estimated from the past travel locus of the subject vehicle are compared, and when the degree of correlation therebetween is high it is determined that the reliability of the travel locus Tn estimated from the running conditions of the subject vehicle is high. Therefore, it is possible to reliably determine a more distant preceding vehicle, by setting as the control object a distant preceding vehicle that is present on the travel locus Tn, thus carrying out an accurate inter-vehicle distance control. On the other hand, when the degree of correlation of the two travel loci Tn and To is low, it is determined that the reliability of the travel locus Tn estimated from the running conditions of the subject vehicle is low. Therefore, it is possible to enhance the accuracy with which the preceding vehicle is determined, by not setting as the control object a distant preceding vehicle that is present on the travel locus Tn.

Further, the travel locus calculator M2 calculates the past travel locus of the subject vehicle based on the plurality of subject vehicle positions plotted in the absolute coordinate system. Therefore, the travel locus calculator M2 becomes less susceptible to the influence of errors due to noise of the yaw rate sensor 12, etc., so that the accuracy with which the past travel locus of the subject vehicle is calculated is improved. As a result, it is unnecessary to carry out filtering in order to remove the influence of noise of the yaw rate sensor 12, thus preventing any delay in calculating the travel locus due to a time delay accompanying filtering, so that the second travel locus estimator M3 can quickly estimate the travel locus To, thus rapidly determining a preceding vehicle.

A third embodiment of the present invention is now described by reference to FIG. 7 and FIG. 8.

Figure 7:
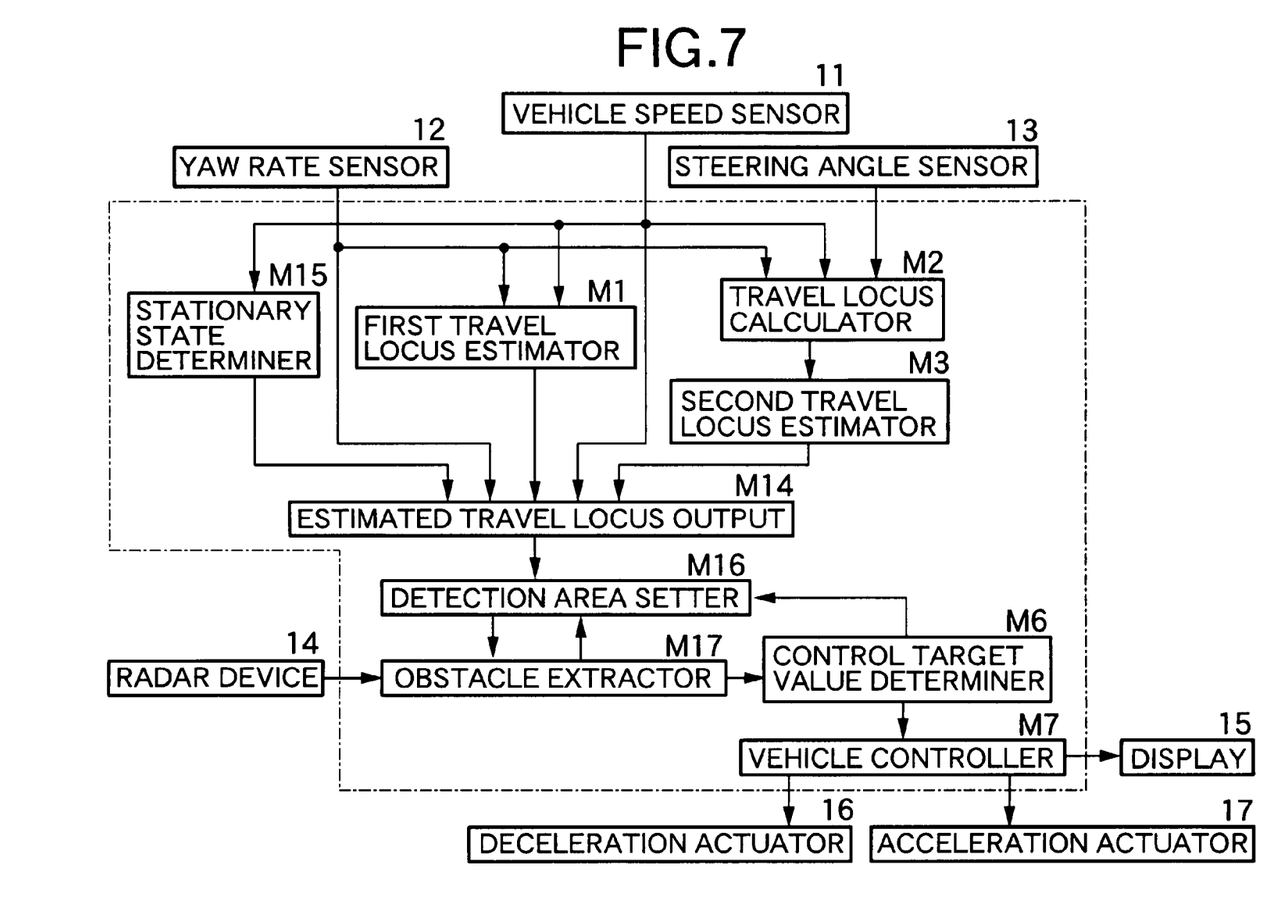
FIG. 7 is a block diagram of a control system for an ACC system.
Figure 8:
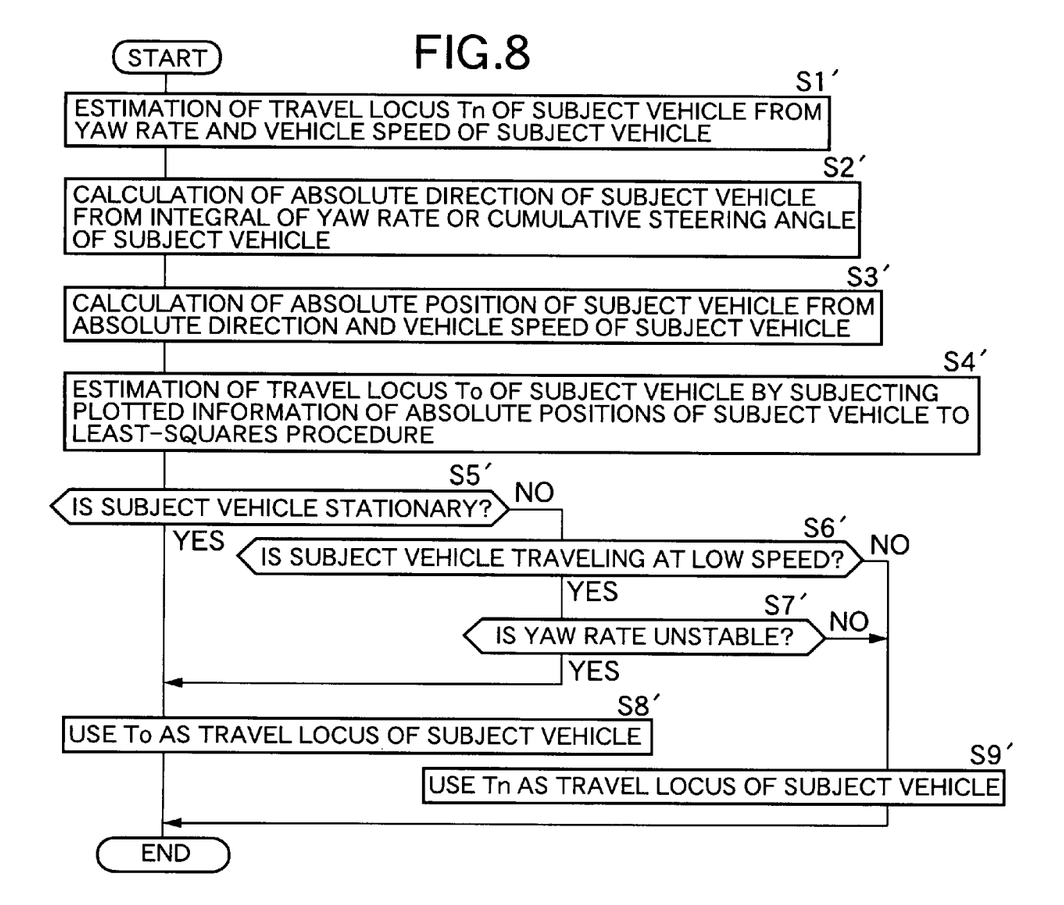
FIG. 8 is a flowchart for explaining the operation.

FIG. 7 shows an ACC (Adaptive Cruise Control) system which maintains a preset inter-vehicle distance when there is a preceding vehicle, thus tracking the preceding vehicle, and maintains a preset vehicle speed when there is no preceding vehicle, thus keeping the speed constant. The ACC system includes: first travel locus estimator M1; travel locus calculator M2; second travel locus estimator M3; estimated travel locus output M14; stationary state determiner M15; detection area setter M16; obstacle extractor M17; control target value determiner M6; and vehicle controller M7.

Connected to the first travel locus estimator M1 are a vehicle speed sensor 11 and a yaw rate sensor 12. Connected to the travel locus calculator M2 are the vehicle speed sensor 11, the yaw rate sensor 12, and a steering angle sensor 13. Connected to the estimated travel locus output M14 are the vehicle speed sensor 11 and the yaw rate sensor 12. Connected to the stationary state determiner M15 is the vehicle speed sensor 11. Connected to the obstacle extractor M17 is a radar device 14. Connected to the vehicle controller M7 are a display 15, a deceleration actuator 16, and an acceleration actuator 17.

The first travel locus estimator M1, the travel locus calculator M2, the second travel locus estimator M3, the control target value determiner M6, and the vehicle controller M7 have the same functions as those of the first embodiment.

The estimated travel locus output M14 provides one that has higher accuracy from among a future travel locus Tn of the subject vehicle estimated by the first travel locus estimator M1 and a future travel locus To of the subject vehicle estimated by the second travel locus estimator M3. That is, if the stationary state determiner M15 determines that the vehicle speed detected by the vehicle speed sensor 11 is substantially zero and thus the vehicle is in a substantially stationary state, the estimated travel locus output M14 provides the future travel locus To of the subject vehicle estimated by the second travel locus estimator M3.

The reason therefor is that the first travel locus estimator M1 estimates the future travel locus Tn of the subject vehicle based on the vehicle speed and the yaw rate, and the yaw rate is zero when the vehicle is stationary, so that an error occurs in estimating the future travel locus Tn of the subject vehicle. In this case, by employing the future travel locus To of the subject vehicle estimated by the second travel locus estimator M3 based on the past travel locus of the subject vehicle, it is possible to avoid the influence of this error.

When the subject vehicle is not stationary and the vehicle speed is equal to or greater than a predetermined value, or when the yaw rate outputted by the yaw rate sensor 12 is stable even if the vehicle speed is less than the predetermined value, the estimated travel locus output M14 provides the future travel locus Tn of the subject vehicle estimated by the first travel locus estimator M1.

The reason therefor is that, when the vehicle speed is equal to or greater than the predetermined value, the accuracy of the output of the yaw rate sensor 12 is guaranteed, so that the accuracy of the future travel locus Tn of the subject vehicle estimated by the first travel locus estimator M1 using the yaw rate is guaranteed. Even when the vehicle speed is less than the predetermined value, if the output of the yaw rate sensor 12 is stable, the accuracy of the future travel locus Tn of the subject vehicle estimated by the first travel locus estimator M1 using the yaw rate is guaranteed.

When the subject vehicle is not stationary but the vehicle speed is less than the predetermined value, and the yaw rate outputted by the yaw rate sensor 12 is unstable, the estimated travel locus output M14 provides the future travel locus To of the subject vehicle estimated by the second travel locus estimator M3.

As described above, when the reliability of the detected yaw rate is high, the accuracy of the future travel locus Tn of the subject vehicle estimated by the first travel locus estimator M1 is higher than the accuracy of the future travel locus To of the subject vehicle estimated by the second travel locus estimator M3. Therefore, it is possible to enhance the overall accuracy with which the travel locus is estimated, by preferentially outputting the future travel locus Tn of the subject vehicle estimated by the first travel locus estimator M1. When the yaw rate cannot be detected or the reliability of the detected yaw rate is low, the accuracy of the future travel locus To of the subject vehicle estimated by the second travel locus estimator M3 is higher than the future travel locus Tn of the subject vehicle estimated by the first travel locus estimator M1. Therefore, it is possible to enhance the overall accuracy with which the travel locus is estimated, by preferentially outputting the future travel locus To of the subject vehicle estimated by the second travel locus estimator M3.

The detection area setter M16 sets a detection area having a predetermined width along a central line which is the future travel locus of the subject vehicle outputted by the estimated travel locus output M14. The radar device 14 transmits electromagnetic waves such as a laser beam or milli-waves, and receives reflected waves which are the electromagnetic waves reflected from an object, thereby detecting the direction of the object, the distance to the object, the relative speed of the object, etc. The obstacle extractor M17 extracts, from among the objects detected by the radar device 14, an object that is present within the detection area as the preceding vehicle (obstacle) which is a control object.

While setting the preceding vehicle extracted by the obstacle extractor M17 as the control object, the control target value determiner M6 determines, a target vehicle speed, a target acceleration/deceleration, a target inter-vehicle distance, etc. which are parameters for making the subject vehicle track the preceding vehicle. The vehicle controller M7 operates the deceleration actuator 16 or the acceleration actuator 17 based on the control target values determined by the control target value determiner M6 so as to make a throttle valve open or close or operate a brake system, thus carrying out tracking control or constant speed travel control; and displays the present control state of the vehicle on the display 15, thus informing a driver thereof.

The above operation related to estimation of the future travel locus of the subject vehicle is now further described by reference to the flowchart of FIG. 8.

Firstly in step S1' the first travel locus estimator M1 estimates the future travel locus Tn of the subject vehicle based on the yaw rate and the vehicle speed. In the subsequent step S2' the travel locus calculator M2 calculates an absolute direction of the subject vehicle in an absolute coordinate system from the integral of the yaw rate or the cumulative steering angle. In step S3' an absolute position of the subject vehicle in the absolute coordinate system is calculated at predetermined time intervals from the absolute direction and the vehicle speed, and further in step S4' the coordinates of a plurality of absolute positions of the subject vehicle obtained at predetermined time intervals are subjected to a least-squares procedure so as to calculate the past travel locus of the subject vehicle, and the second travel locus estimator M3 estimates the future travel locus To of the subject vehicle from the past travel locus of the subject vehicle.

If in the subsequent step S5' the subject vehicle is stationary, then in step S8' the future travel locus To of the subject vehicle estimated by the second travel locus estimator M3 is outputted. On the other hand, even if in step S5' the subject vehicle is not stationary, when in step S6' the vehicle speed is less than the predetermined value and in step S7' the yaw rate is not stable, then in step S8' the future travel locus To of the subject vehicle estimated by the second travel locus estimator M3 is similarly outputted.

If in step S6' the vehicle speed is equal to or greater than the predetermined value or in step S7' the yaw rate is stable, then in step S9' the future travel locus Tn of the subject vehicle estimated by the first travel locus estimator M1 is outputted.

Figure 9:
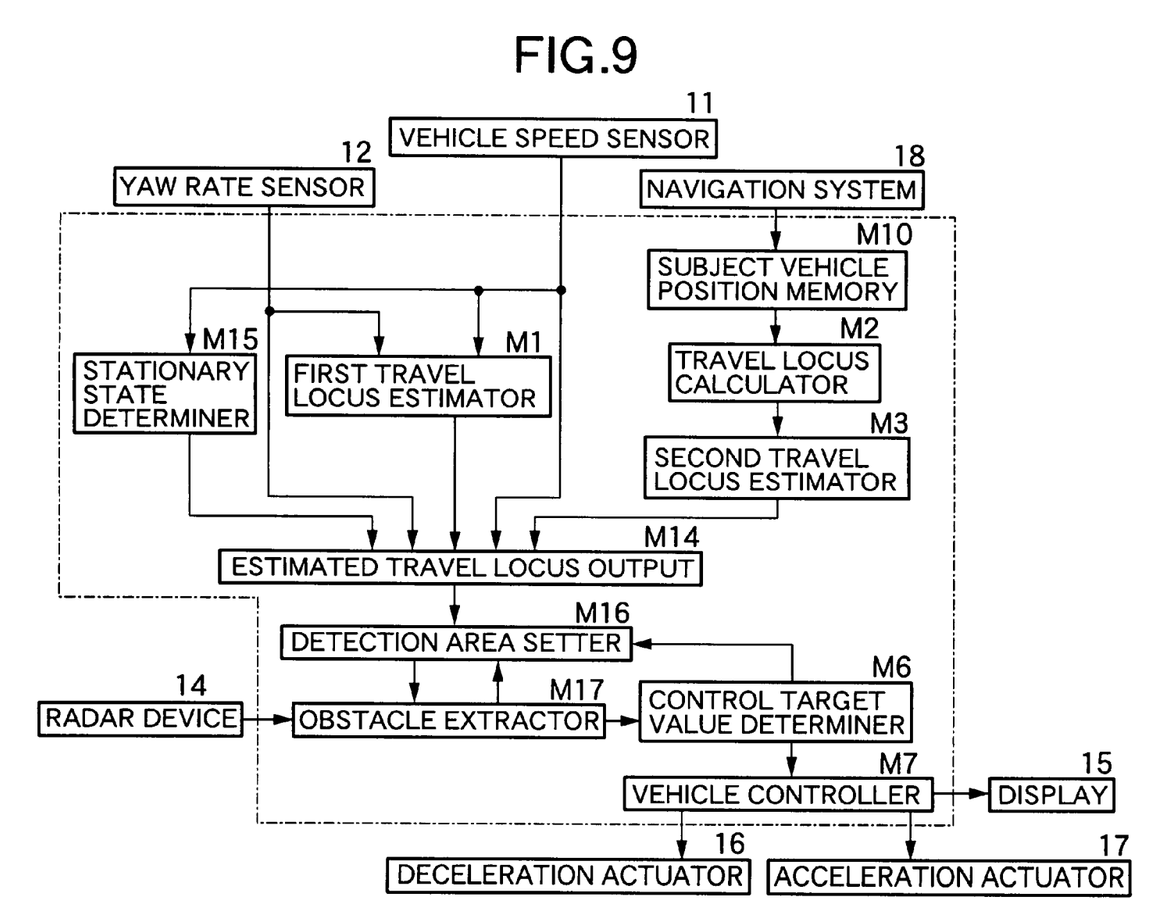
FIG. 9 is a block diagram of a control system for an ACC system according to a fourth embodiment of the present invention.

A fourth embodiment of the present invention is now described by reference to FIG. 9.

In the third embodiment the vehicle speed sensor 11, the yaw rate sensor 12, and the steering angle sensor 13 are connected to the travel locus calculator M2, but in the fourth embodiment subject vehicle position memory M10 connected to a navigation system 18 is connected to travel locus calculator M2.

Since the navigation system 18 is capable of successively detecting subject vehicle positions, the subject vehicle position is stored in the subject vehicle position memory M10 at predetermined time intervals, and the travel locus calculator M2 can calculate a past travel locus of the subject vehicle from a plurality of past subject vehicle positions stored in the subject vehicle position memory M10.

Other arrangements and effects of the fourth embodiment are the same as those of the above-mentioned third embodiment.

Although embodiments of the present invention have been described above, the present invention can be modified in a variety of ways without departing from the subject matter of the present invention.

For example, an ACC system has been described in the embodiments, but the present invention is not limited to the ACC system and is applicable to a vehicular travel locus estimation system or a vehicular control object determination system for any purpose.

Furthermore, the subject vehicle position detector is not limited to the navigation system 18 of the embodiment, and may be a road-vehicle communication system such as a beacon.

What is claimed is:

1. A vehicular travel locus estimation system comprising:
an object detector detecting a plurality of objects that are present in a direction of travel of a vehicle;
a vehicle speed sensor configured to detect a vehicle speed;
a yaw rate sensor configured to detect a yaw rate;
a first travel locus estimator operatively coupled to the vehicle speed sensor and the yaw rate sensor, the first travel locus estimator estimating a first future travel locus of the vehicle based on at least the vehicle speed detected by the vehicle speed sensor and the yaw rate detected by the yaw rate sensor;
a travel locus calculator calculating a past travel locus of the vehicle;
a second travel locus estimator estimating a second future travel locus of the vehicle based on the calculated past travel locus;
a control object determiner determining a control object;
a stationary state determiner determining whether the vehicle is in a substantially stationary state; and
an estimated travel locus output providing the first future travel locus estimated by the first travel locus estimator to the control object determiner when the stationary state determiner determines that the vehicle is not in a substantially stationary state and providing the second future travel locus estimated by the second travel locus estimator instead of the first future travel locus estimated by the first travel locus estimator to the control object determiner when the stationary state determiner determines that the vehicle is in a substantially stationary state;
wherein the control object determiner is configured to determine the control object from the plurality of objects based on the first future travel locus if the vehicle is not in a substantially stationary state and on the second future travel locus if the vehicle is in a substantially stationary state.

2. The vehicular travel locus estimation system according to claim 1, wherein the travel locus calculator has an absolute coordinate system that enables a subject vehicle position and a subject vehicle direction of the vehicle to be recorded in a memory device with a given point as a reference, calculates a subject vehicle direction in the absolute coordinate system based on the yaw rate detected by the yaw rate sensor, calculates a plurality of subject vehicle positions based on the calculated subject vehicle direction and the vehicle speed detected by the vehicle speed sensor, and calculates the past travel locus of the vehicle from the plurality of calculated subject vehicle positions in the absolute coordinate system.

3. The vehicular travel locus estimation system according to either claim 1, wherein the system further comprises a steering angle sensor detecting a steering angle of the vehicle, and wherein the travel locus calculator has an absolute coordinate system that enables a subject vehicle position and a subject vehicle direction of the vehicle to be recorded in a memory device with a given point as a reference, calculates a subject vehicle direction in the absolute coordinate system based on the steering angle detected by the steering angle sensor, calculates a plurality of subject vehicle positions based on the calculated subject vehicle direction and the vehicle speed detected by the vehicle speed sensor, and calculates the past travel locus of the vehicle from the plurality of calculated subject vehicle positions in the absolute coordinate system.

4. The vehicular travel locus estimation system according to claim 1, wherein the system further comprises subject vehicle position detector detecting a subject vehicle position in an absolute coordinate system based on a signal from outside the vehicle, and subject vehicle position memory storing the detected subject vehicle position, and wherein the travel locus calculator calculates the past travel locus of the vehicle from a plurality of subject vehicle positions stored by the subject vehicle position memory.

5. The vehicular travel locus estimation system according to claim 2, wherein the travel locus calculator calculates the past travel locus of the vehicle by subjecting the plurality of subject vehicle positions in the absolute coordinate system to a least-squares procedure.

6. The vehicular travel locus estimation system according to claim 3, wherein the travel locus calculator calculates the past travel locus of the vehicle by subjecting the plurality of subject vehicle positions in the absolute coordinate system to a least-squares procedure.

7. The vehicular travel locus estimation system according to claim 4, wherein the travel locus calculator calculates the past travel locus of the vehicle by subjecting the plurality of subject vehicle positions in the absolute coordinate system to a least squares procedure.

* * * * *